Rudolf Genähr
Erich Schwab
INVENTORS.

BY Karl F. Ross
Attorney

United States Patent Office 3,461,304
Patented Aug. 12, 1969

3,461,304
SYSTEM FOR MEASURING ANGULAR DISPLACEMENT OF SHAFTS ROTATING AT DIFFERENT SPEEDS
Rudolf Genähr, Bad Kreuznach, and Erich Schwab, Bad Munster am Stein, Germany, assignors to Jos. Schneider & Co., Bad Kreuznach, Germany, a corporation of Germany
Filed Sept. 29, 1966, Ser. No. 582,926
Claims priority, application Germany, Oct. 2, 1965, Sch 37,810
Int. Cl. H01j *39/12*
U.S. Cl. 250—227     6 Claims Our present invention relates to a system for measuring the angular displacement of a disk, shaft or other rotary member turning intermittently or continuously about an axis.

The general object of this invention is to provide a system for measuring such angular displacement, either with reference to a given zero position or cumulatively as an indication of rotary speed, without any physical contact between the rotating member and the measuring equipment proper.

This object is realized, in accordance with our invention, by the provision of a second member rotating at constant speed about the axis of rotation of the first member and by the provision of a concentrated source of light on one of the two members at a location offset from their common axis, the other member carrying light-receiving means, preferably in the form a filamentary light conductor, positioned for periodic confrontation with the concentrated light source so that a measuring light pulse is generated during each confrontation; a reference pulse, occurring whenever the second member passes through a zero position, is generated once per revolution by suitable optical signalling means which, pursuant to another feature of our invention, advantageously also include a filamentary light conductor. The two light pulses so generated, i.e. the reference pulse and the measuring pulse, are fed to an indicator which registers, for instantaneous observation and/or in the form of a permanent record, an output representative of the time interval between the two pulses.

According to a more particular aspect of our invention, the first rotary member (i.e. the one whose angular displacement is to be measured) carries a filamentary light conductor having one end disposed along the axis and another end offset from the axis, the latter end serving either as a concentrated emitter or as a concentrated receiver of light rays. In the first instance, the axially disposed end of this light conductor is illuminated by a source of radiation which may be a lamp directly confronting that end or, according to still another feature of the invention, may be constituted by a further filamentary light conductor supported axially on the second rotating member while picking up light at an extremity remote from the first rotary member. In the second instance, with the concentrated source of light carried on the uniformly rotating second member, this source may also be represented by the output end of a filamentary light conductor having an input end disposed on the axis of rotation for illumination by an external light source.

The term "filamentary light conductor," as used herein, encompasses both a single optically effective fiber and a plurality of such fibers; in the latter case, the fibers are advantageously arrayed in a radial plane when offset from the axis of rotation and bundled in a cylindrical or tubular cluster when extending along the axis. When the constantly rotating member carries two distinct light conductors for the transmission or the generation of the measuring pulse and the reference pulse, respectively, axially extending portions of these conductors may be disposed one within the other, i.e. in nested relationship.

The above and other features of our invention will become more clearly apparent from the following detailed description of several embodiments, reference being made to the accompanying drawing in which.

Figure 1:
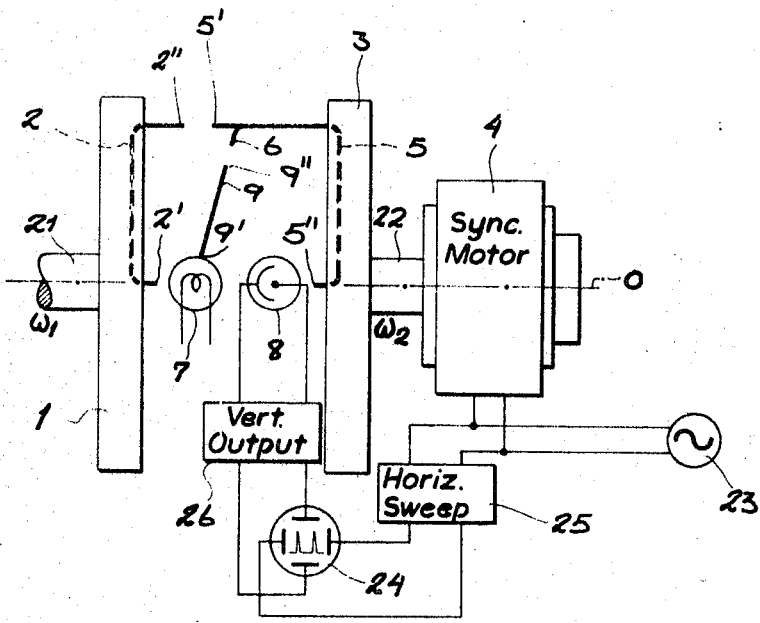
FIG. 1 is a somewhat diagrammatic transverse view of a pair of coaxial rotary members and associated optical and electrical elements for measuring the angular displacement of the first of these members in accordance with our invention.

The system shown in FIG. 1 comprises a disk 1 on a shaft 21, the member 1, 21 being rotatable about an axis O. A filamentary light conductor 2, consisting of one or more fibers of transparent glass or plastic material, extends substantially radially along disk 1 and has an input end 2' on axis O and an output end 2' remote from that axis. A second rotatable member, consisting of a disk 3 on a shaft 22, is driven at constant speed by a motor 4 which may be of the synchronous type and is here shown connected to an A-C source 23. Another filamentary light conductor 5 is carried on disk 3 and has an eccentrically located input end 5' confronting the output end 2" of conductor 2 whenever the two disks 1, 3 are in a predetermined relative position; the output end 5" of conductor 5 lies on the axis O.

A source of light, indicated diagrammatically as a lamp 7, continuously illuminates the axially disposed input end 2' of conductor 2 so that the corresponding output end 2" acts as a concentrated radiation emitter. The term "concentrated" is not meant to exclude the possibility of a certain broadening of the fiber bundle, partially in a radial direction, beyond what might otherwise be referred to as a pinpoint. The concentrated light rays from output end 2" impinge, once per revolution of shaft 22, upon the input end 5' of conductor 5 and are emitted by the output end 5" thereof toward a photoelectric transducer 8 shown diagrammatically as a photocell.

Lamp 7 also forms part of an arrangement for generating a reference light source in a zero position of the constant-speed rotary member 3, 22. For this purpose a fixed filamentary light conductor 9 extends generally radially outwardly from lamp 7, the input end 9' of this conductor being close to the lamp while its output end 9" is aligned with a branch 6 of light conductor 5 whenever the extremity 5' of this conductor lies in the same radial plane as conductor 9. Thus, the photocell 8 will receive two distinct light pulses during each revolution of disk 3 unless the output end 2" of light conductor 2 happens to be also coplanar with conductor 9, i.e. unless the member 1, 21 is likewise in the aforementioned zero position; this presupposes, however, that shaft 21 and disk 1 rotate at an average speed $\omega_1$ which, if greater than zero, should be less and preferably very much less than the constant rotary speed $\omega_2$ of disk 3 and shaft 33.

Photocell 8 forms part of a load circuit having means for registering the time interval between the reference pulse from conductor 9 and the measuring pulse from conductor 2 as an indication of the instantaneous angular deviation of disk 1 from the aforementioned zero position. This load circuit is here shown as comprising, by way of example, a cathode-ray oscilloscope 24 whose horizontal sweep circuit 25 is connected across a source 23 and whose vertical deflection-control circuit 26 responds to the output of photocell 8. The screen of oscilloscope 24 will, therefore, display at any time a pair of horizontally spaced pips whose separation is proportional to the arc length between the zero position (plane of conductor 9) and the position of output 2" at the instant of its confrontation with input end 5'. With $|\omega_2|\gg|\omega_1|$, the resulting stroboscopic effect will cause an apparent relative displacement of the two pips at a rate proportional to $\omega_1$.

Figure 2:
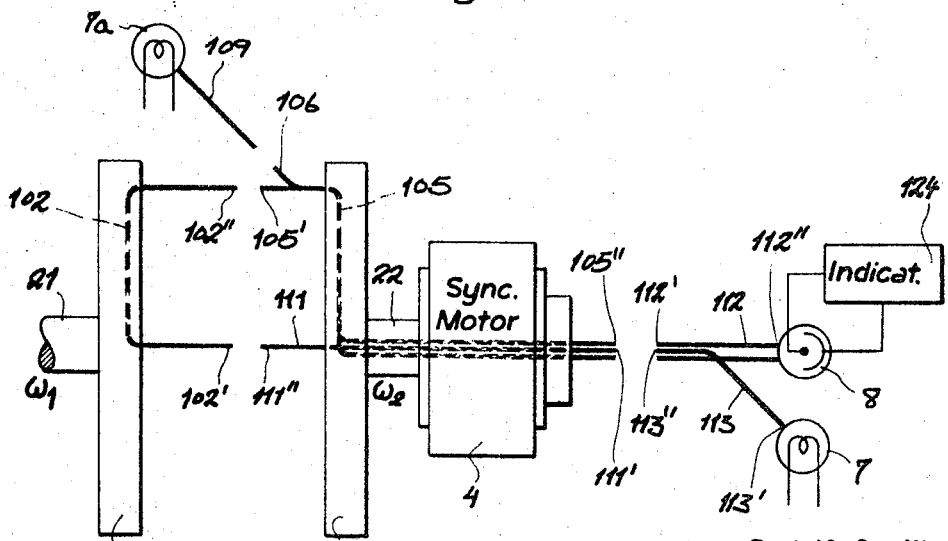
FIGS. 2 and 3 are views similar to FIG. 1, illustrating two modifications of the system.

In the system of FIG. 2, which includes the same rotatable members 1, 21, 5 and 22 as well as motor 4, disk 1 carries a light conductor 102 similar to conductor 2 with an axially disposed input end 102' opposite an output end 111" of another filamentary light conductor 11 extending axially through the shaft 22. A conductor 105, similar to conductor 5 of FIG. 1, again has its input end 105' positioned for iterative confrontation with the output end 102" of conductor 102. A branch 106 of conductor 105 periodically confronts, in a zero position, a fixed light conductor 109 terminating at a light source in the form of a lamp 7a. Light source 7 illuminates an input end 113' of an angularly deflected spur of an extension conductor 113 whose output end 113" faces the input end 111' of axial conductor 111. Conductor 105 has an output end 105" facing an input end 112" of another extension conductor 112 whose output end 112" terminates at photocell 8. An indicator 124, which may be similar to oscilloscope 24 and associated circuitry of FIG. 1, has been shown diagrammatically and is connected across the output of photocell 8.

In operation, the light from lamp 7a is periodically transmitted via filamentary conductors 109, 106, 105 and 112 to the output circuit 8, 124 to indicate the zero position of the disk 3; a measuring pulse is similarly transmitted to this output circuit from lamp 7 via light conductors 113, 111, 102 and 105. The axially disposed portions of light conductors 111 and 105 are shown in nested relationship, with the fibers of conductor 105 formed into a tubular array coaxially sheathing the fibers of conductor 111.

Figure 3:
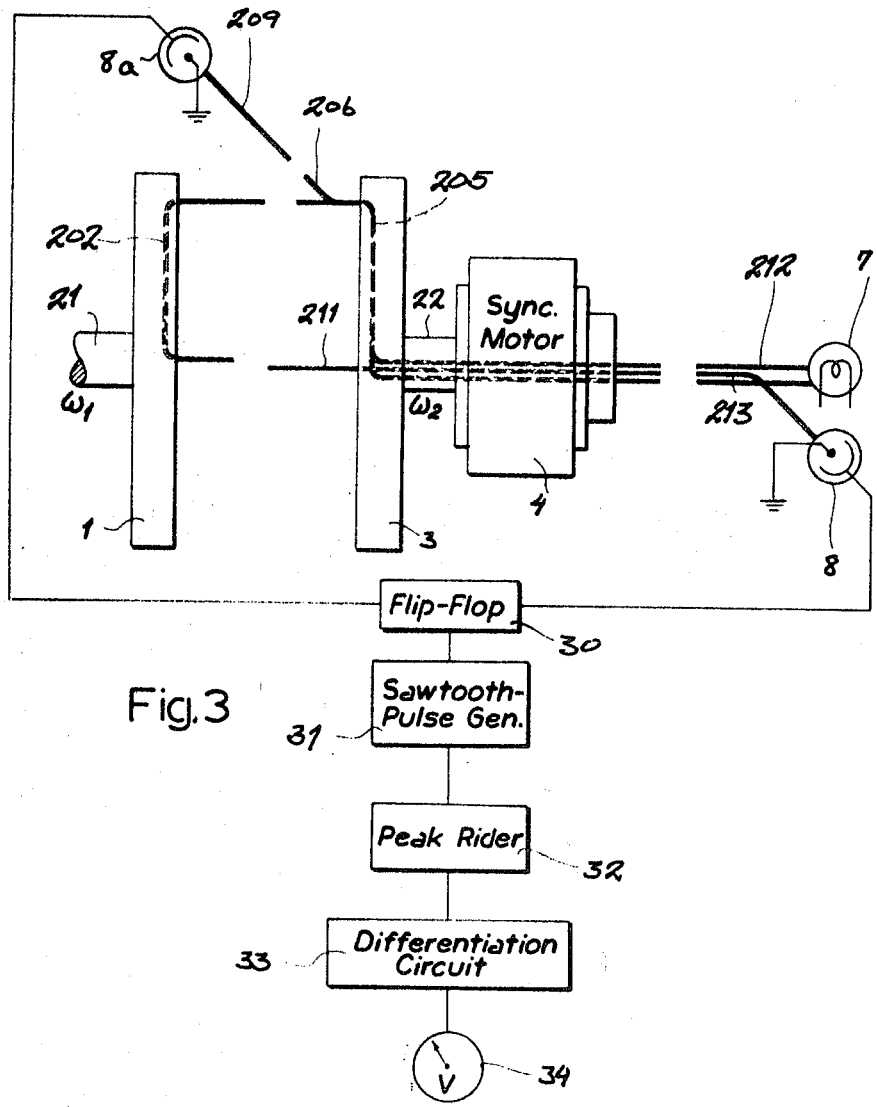

The system of FIG. 3 is generally similar to that of FIG. 2 and includes, besides the elements 1, 3, 4, 21 and 22 already described, a light conductor 202 on disk 1 and two partly coaxial light conductors 205, 211 on disk 3 and shaft 22. The roles of conductors 205 and 211 have been interchanged, with reference to conductors 105 and 111 of FIG. 2, in that lamp 7 now illuminates via extension conductor 212 the radially deflected conductor 205 while photocell 8 receives the ouput of axially positioned conductor 211 through extension conductor 213. A branch 206 of conductor 205 periodically confronts a stationary conductor 209 terminating at another photocell 8a. Thus, the light path for the reference pulse leads from lamp 7 via conductors 212, 205, 206 and 209 to cell 8a whereas the light path for the measuring pulse extends from lamp 7 by way of conductors 212, 205, 202, 211 and 213 to photocell 8.

While the system of FIG. 3 is based on the same principles as that of the systems described above, a difference exists in the fact that the reference and measuring pulses are picked up by different photocells 8a and 8, respectively. With this arrangement, therefore, it is possible to indicate the two types of pulses by the reversal of a flip-flop without any possibility of confusion due to the zero position which may involve the successive generation of two reference pulses without an intervening measuring pulse. The load circuit of the system of FIG. 3 has, accordingly, been shown as including a flip-flop 30 working into a sawtooth-pulse generator 31 whose output wave controls a peak rider 32 working through a differentiation circuit 33 into an indicator 34 here shown as a voltmeter. The operation of this load circuit will be described hereinafter with reference to FIG. 5.

Figure 4:
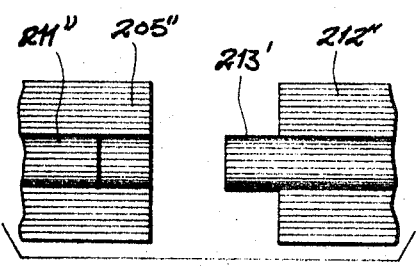
FIG. 4 is a view of a detail of FIG. 3 drawn to a larger scale.

The confronting extremities of two pairs of coaxial light-conductive cables, as shown with reference to conductors 105, 111–113 in FIG. 2 and 205, 211–213 in FIG. 3, are preferably offset in axial direction to minimize the irradiation of an outer conductor by a confronting output end of an inner conductor or vice versa. This has been illustrated in FIG. 4 where the input end 205' of conductor 205 (FIG. 3) has been axially extended beyond the output end 211" of conductor 211, the confronting output end 212" of conductor 212 and input end 213' of conductor 213 being complementarily staggered. It will be apparent that light rays leaving the output end 212" of conductor 212 in the direction of output end 211" of inner conductor 211, or light rays emitted from output end 211" toward output end 212", will be intercepted by the projecting input ends 213' and 205' of the associated conductors 213 and 205 without penetrating into these latter conductors. Naturally, an analogous axial staggering may be provided for the coaxial ends of conductors 105, 111, 112 and 113 of FIG. 2, with the output ends 105", 113" again recessed relatively to the associated input ends 111', 112'.

Figure 5:
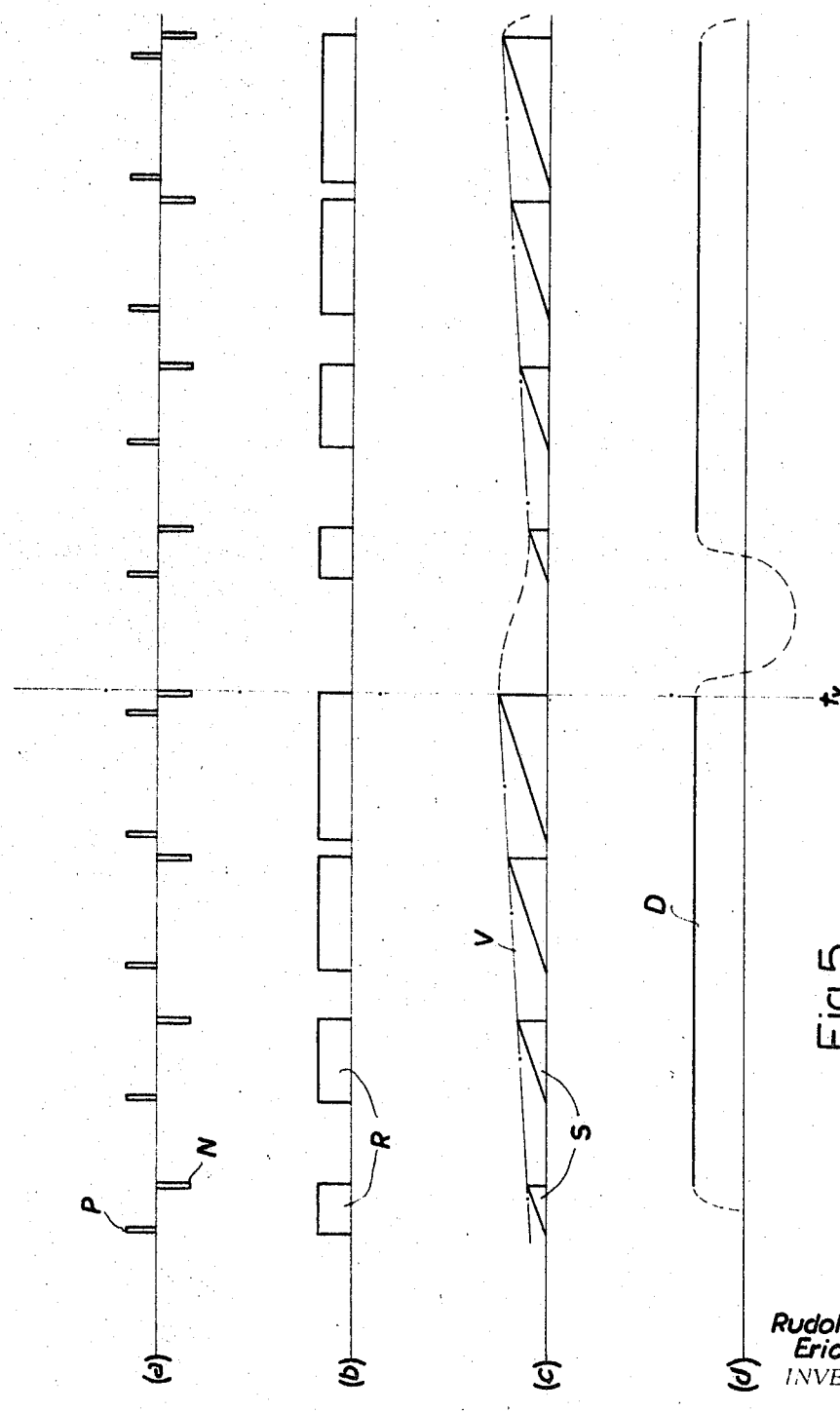
FIG. 5 is a pulse diagram illustrating the performance of the system of FIG. 3.

The reference pulses from photocell 8a and the measuring pulses from photocell 8 in FIG. 3 have shown in graph (a) of FIG. 5 as positive and negative pulses P and N, respectively, coinciding with the leading and trailing edges of rectangular pulses R, graph (b), produced by the flip-flop 30. The conductive state of flip-flop 30 represented by the pulses R causes the charging of a condenser in generator 31, this condenser discharging between pulses R so as to produce a train of sawtooth pulses S as shown in graph (c). Peak rider 33 develops a voltage V representing the envelope of the sawtooth wave S, the differential of that envelope derived by circuit 33 being shown at D in graph (d) of FIG. 5. If the disk 1 rotates at constant speed, the amplitude of pulses D is constant and, as read on voltmeter 34, represents a measure of that speed.

It will be noted that at a time $t_o$, indicated in FIG. 5, the pulses R and S extend over more than a full revolution of disk 3 so that two consecutive reference pulses P occur before the next measuring pulse N. As a result, a discontinuity occurs in voltage waves V and D which, however, can be readily bridged in the output of indicator 34 by the inherent inertia of that indicator, and/or by an interposed integrating circuit of suitable time constant.

Naturally, the output leads of photocells 8 and 8a in FIG. 3 could also be connected jointly to an input of control circuit 26 in FIG. 1 (or an equivalent circuit in indicator 124 of FIG. 2) to produce a visual output on an oscilloscope screen, the oscilloscope 24 of FIG. 1 and the voltmeter 34 of FIG. 3 being representative of a large variety of indicators adapted to be used in any of the disclosed systems to give a reading of either the angle or the speed of rotation of the monitored member 1, 21; the indicators may also include conventional recording devices. These and other modifications, readily apparent to persons skilled in the art, are intended to be embraced within the spirit and scope of our invention as defined in the appended claims.

We claim:
1. A system for measuring the angular displacement of a first member rotatable about an axis, comprising a second member rotatable about said axis; drive means for rotating said second member about said axis at constant speed; a first filamentary light conductor on said first member having an input end and an output end, one of said ends being disposed along said axis, the other of said ends being disposed at a location offset from said axis; a second filamentary light conductor on said second member having an input end positioned for at least intermittent confrontation by said output end of said first light conductor, said second light conductor having an output end in line with said axis; means including a source of radiation positioned for at least intermittent confrontation of the input end of said first light conductor for generating at the output end of said second light conductor a recurring measuring light pulse; optical signaling means independent of said first member and including an auxiliary light-transfer path on said second member for generating a reference light pulse upon said second member passing through a predetermined zero position; and indicating means coupled to said signaling means and including a photoelectric transducer positioned to receive said reference light pulse from the output end of said second light conductor for producing an output representative of the time interval between said reference light pulse and said measuring light pulse.

2. A system as defined in claim 1 wherein said signaling means includes a branch of said second light conductor having an extremity eccentrically positioned on said second member for periodic confrontation with a stationary further filamentary light conductor terminating at a light source for constant illumination thereby.

3. A system as defined in claim 1 wherein said source of radiation includes a third filamentary light conductor carried on said second member with an axially disposed input end extending toward a light source in nested relationship with the output end of said second light conductor.

4. A system as defined in claim 3 wherein said third light conductor has an output end positioned to confront said other end of said first light conductor, said signaling means including a branch of said third light conductor adjacent said output end thereof, said indicating means including another photoelectric transducer positioned to receive light from said branch.

5. A system as defined in claim 3, further comprising a pair of stationary and nested light conductors extending from the nested output and input ends of said second and third light conductor to said transducer and said light source, respectively.

6. A system as defined in claim 5 wherein said nested output and input ends and confronting extremities of said nested light conductors are complementarily staggered in axial direction.

References Cited

UNITED STATES PATENTS

| | | |
|---|---|---|
| 3,153,111 | 10/1964 | Barber et al. |
| 3,192,391 | 6/1965 | Ressler. |
| 3,230,380 | 1/1966 | Cooke. |
| 3,244,063 | 4/1966 | Lawrence. |
| 3,325,594 | 6/1967 | Goldhammer et al. __ 250—227 X |
| 3,327,584 | 6/1967 | Kissinger _____ 250—227 X |
| 3,365,580 | 1/1968 | Cannella _____ 250—227 |
| 3,372,240 | 3/1968 | Boyers et al. _____ 250—227 X |
| 3,375,377 | 3/1968 | Barrows _____ 250—227 X |

ROBERT SEGAL, Primary Examiner

U.S. Cl. X.R.

88—14; 350—96